May 14, 1957 M. J. SCHAA 2,792,238
TRAILER HITCH WITH CROSSED REACHES
Filed Jan. 17, 1956 4 Sheets-Sheet 1
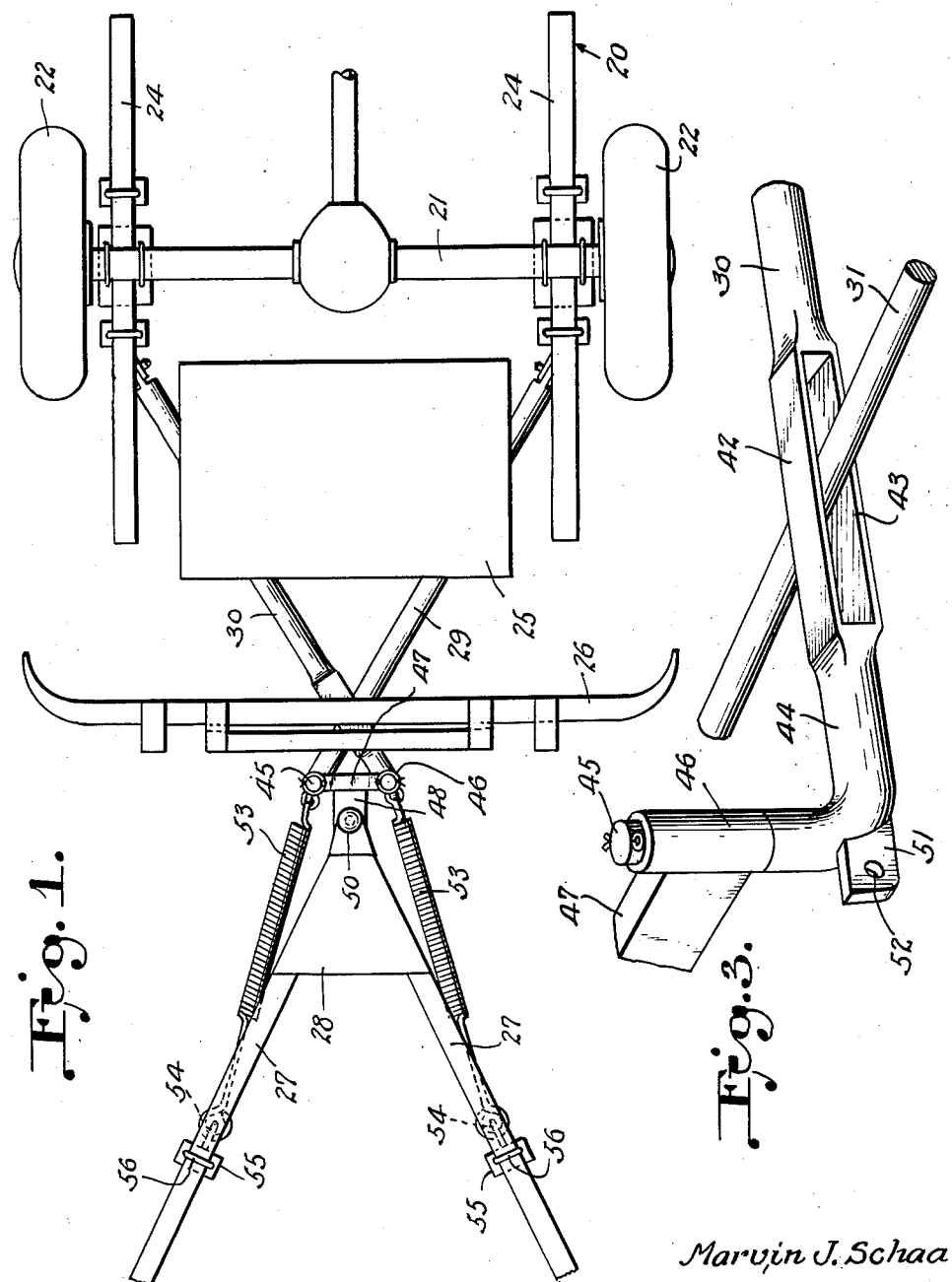
Marvin J. Schaa
INVENTOR
BY Cashowles.
ATTORNEYS.

May 14, 1957  M. J. SCHAA  2,792,238
TRAILER HITCH WITH CROSSED REACHES
Filed Jan. 17, 1956  4 Sheets-Sheet 2
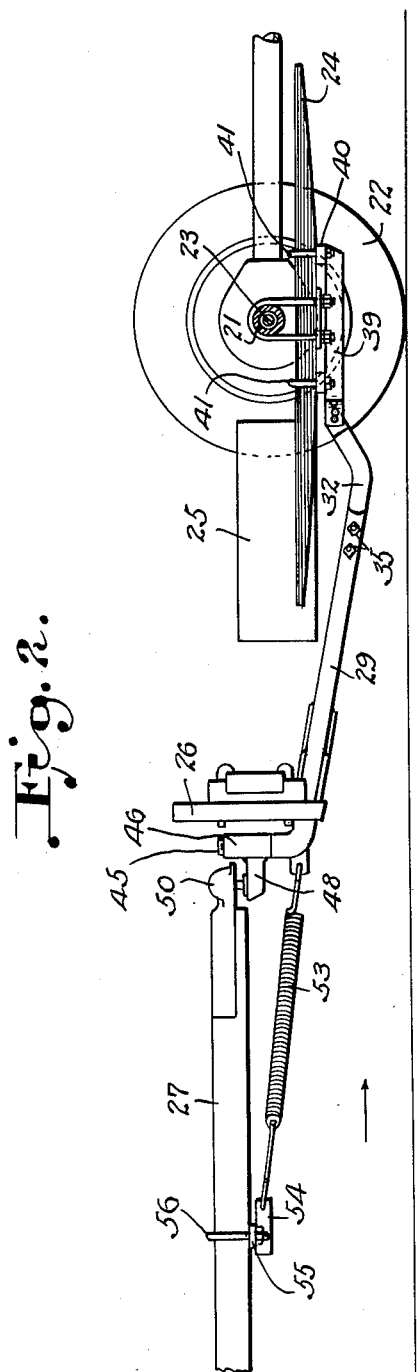
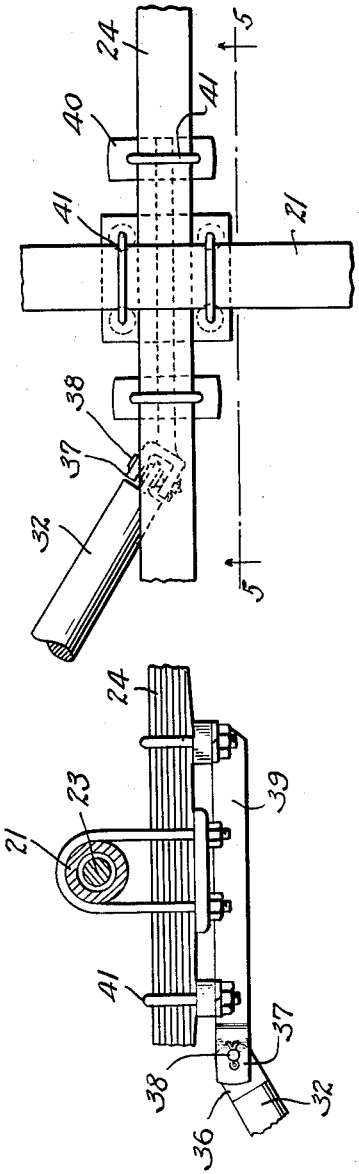
Marvin J. Schaa
INVENTOR
BY CA Knowles.
ATTORNEYS.

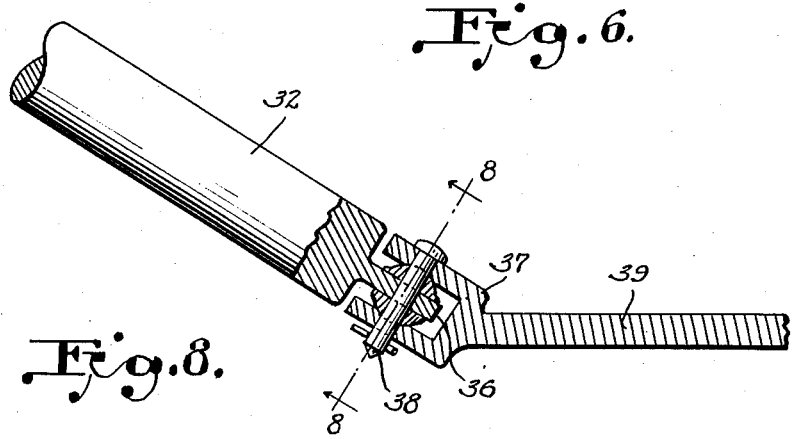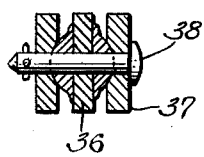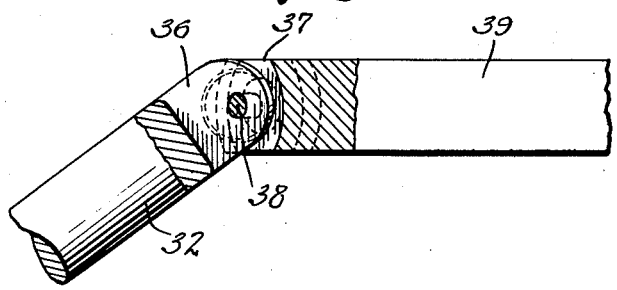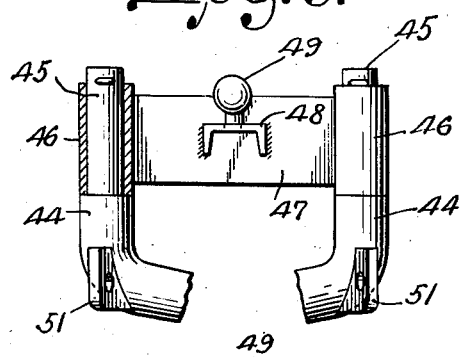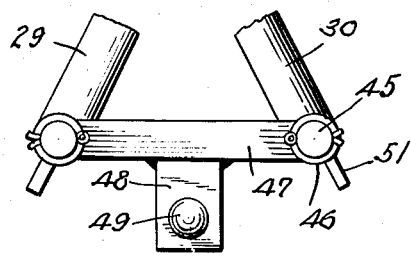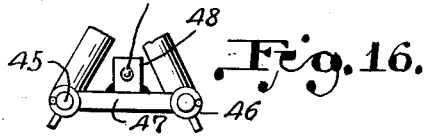

May 14, 1957 M. J. SCHAA 2,792,238
TRAILER HITCH WITH CROSSED REACHES
Filed Jan. 17, 1956 4 Sheets-Sheet 4
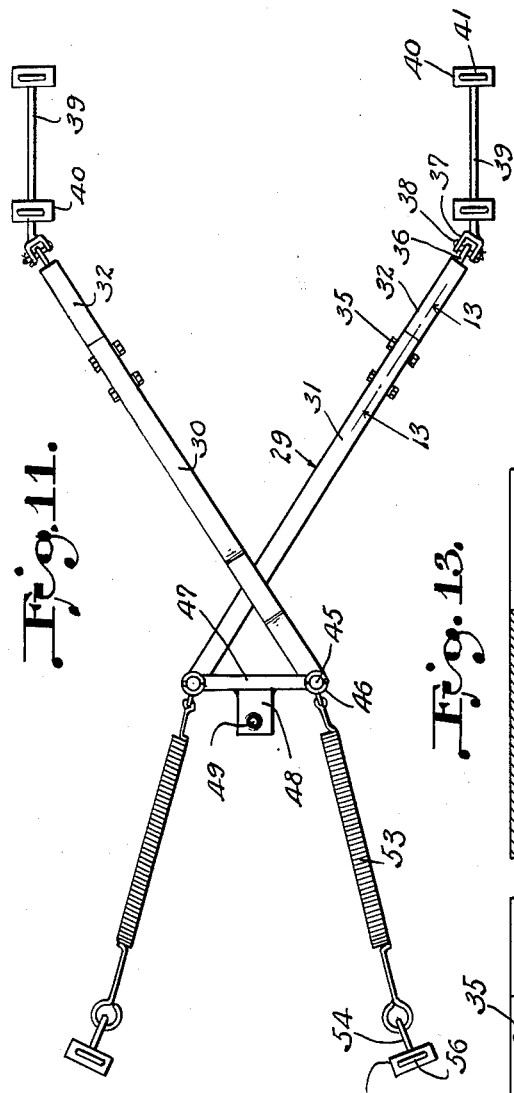
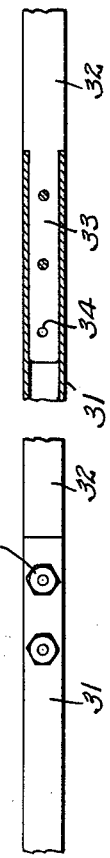
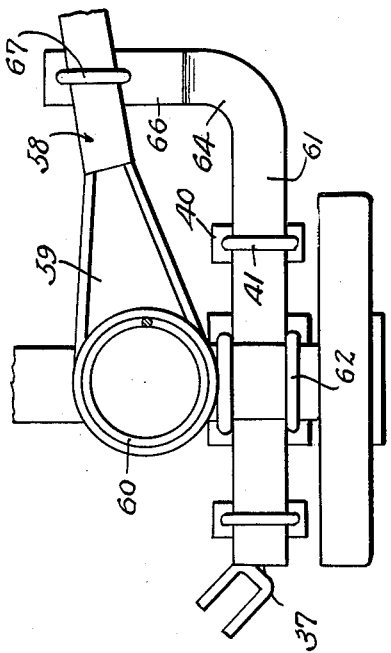
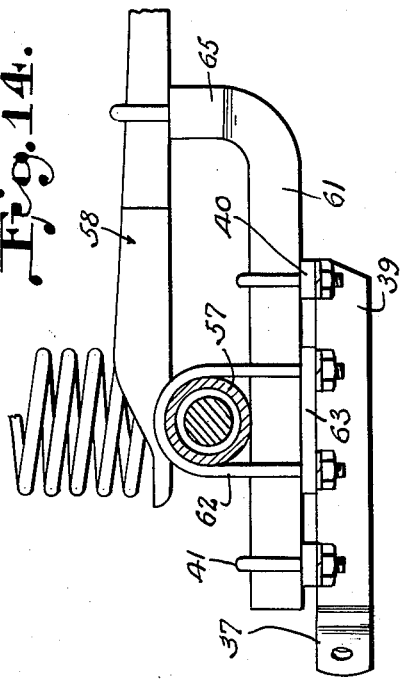
Marvin J. Schaa
INVENTOR
BY
ATTORNEYS.

United States Patent Office 2,792,238
Patented May 14, 1957

2,792,238

TRAILER HITCH WITH CROSSED REACHES

Marvin J. Schaa, Sibley, Iowa

Application January 17, 1956, Serial No. 559,584

1 Claim. (Cl. 280—458)

This invention relates to trailer hitches.

An object of this invention is to provide an improved trailer hitch which embodies a pair of crossed bars adapted to be connected at their rear ends to the trailer coupling means which is under spring tension so that the trailer will be kept in line with the tractor.

Another object of this invention is to provide an improved hitch which will prevent any whipping of the trailer as the tractor and trailer move over the road.

Another object of this invention is to provide a trailer hitch which will make driving easier when pulling a trailer than is possible with hitches at present available.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Figure 1 is a fragmentary plan view showing in skeleton form a tractor vehicle with a trailer hitch connected thereto and a hitch connected to the draw bar of a trailer.

Fig. 2 is a detail side elevation of the hitch shown in Fig. 1.

Fig. 3 is an enlarged fragmentary perspective view showing the connection between the draw bars and the trailer coupler.

Fig. 4 is a fragmentary plan view showing the connection between the forward ends of the draw bars and the tractor vehicle.

Fig. 5 is a fragmentary sectional view taken on line 5—5 of Fig. 4.

Fig. 6 is a fragmentary longitudinal section showing the connection between the tractor attaching means and the draw bars.

Fig. 7 is a fragmentary side elevation partly broken away and in section of the structure shown in Fig. 6.

Fig. 8 is a sectional view taken on line 8—8 of Fig. 6.

Fig. 9 is a fragmentary rear elevation partly in section showing the connection between the crossed draw bars and the coupler.

Fig. 10 is a fragmentary plan view of the structure shown in Fig. 9.

Fig. 11 is a plan view of the trailer hitch removed from the tractor and trailer vehicles.

Fig. 12 is a fragmentary side elevation of one of the draw bars or tongues.

Fig. 13 is a fragmentary sectional view taken on line 13—13 of Fig. 11.

Fig. 14 is a fragmentary vertical section showing the connection between the parallel hitch and a vehicle embodying spiral springs.

Fig. 15 is a fragmentary plan view of the structure shown in Fig. 14.

Fig. 16 is a fragmentary plan view showing the reverse mounting of the trailer coupler.

Referring to the drawings, and first to Figs. 1 to 13, inclusive, the numeral 20 designates generally a tractor vehicle having a rear axle housing 21 and wheels 22 mounted on a rear axle 23. The tractor 20 includes a pair of rear semi-elliptical or bowed springs 24 which are connected through shackles (not shown) to a body which is not shown for facility of reference. The tractor vehicle 20 may also include a luggage rack or trunk 25 and a rear bumper 26. The rack 25 and the bumper 26 are secured to the tractor frame in a conventional manner and are here shown only for the purpose of indicating the position of the trailer hitch assembly with respect to the rear of the tractor vehicle 20.

In order to provide means whereby a trailer may be coupled to the tractor vehicle 20 with the trailer having a pair of forwardly convergent draw bars 27 connected to a triangular plate 28, I have provided a trailer hitch construction as will be hereinafter described. The trailer hitch construction embodies a pair of crossed draw bars 29 and 30 which are of extensible construction and each includes a relatively long bar 31 with a short forwardly extending bar 32 having a reduced rear portion 33. The rear portion 33 extends into the forward end of the bar 31 and bar 31 is preferably of tubular construction. The reduced portion 33 of bar 32 is provided with spaced openings 34 through selected pairs of which large bolts 35 are extended. The front end of each bar 32 is provided with a flat extension 36 which extends between the arms of a fork 37. The extension 36 is pivoted between the arms of the fork 37 by means of a pivot 38. An obtusely angled forwardly extending flat bar 39 is formed integral with fork 37 and is secured to a pair of right-angularly disposed clamping bars 40. The bars 40 have a pair of U-bolts 41 extending therethrough and the bolts 41 extend about the springs 24. The bar 30 as shown more clearly in Fig. 3, is provided with a split intermediate portion which includes upper and lower flat bars 42 and 43 respectively. The bars 42 and 43 form an opening through the rear portion of bar 30 through which bar 29 loosely and slidably engages. The bars 42 and 43 have formed integral with the rear ends thereof a substantially L-shaped member 44 which includes a reduced diameter stud 45. The stud 45 loosely engages through a vertical bushing 46 which is carried by a connecting bar 47, and connecting bar 47 has projecting from the rear side thereof a coupling plate 48. The coupling plate 48 as shown in Fig. 9 is of U-shape in transverse section and plate 48 has fixed thereto a ball member 49 which is adapted to be mounted in a ball socket 50 extending from plate 28. Each L-shaped member 44 has a rearwardly projecting ear 51 formed with an opening 52 through which the forward end of a spring 53 is extended. There are two of these springs 53, as shown in Figs. 1 and 11, and the rear end of the springs 53 are secured to eyes 54 which project from a plate 55. The two plates 55 are secured to the trailer draw bars 27 by means of U-bolts 56.

Referring now to Figs. 14 and 15 there is shown a trailer hitch as hereinbefore described which is mounted on the rear and frame of a tractor vehicle which is provided with spiral springs between the body and the vehicle frame. As shown in Figs. 14 and 15, the axle housing 57 is disposed thereabove the rear end of a vehicle frame 58 and the frame 58 includes a spiral spring seat 59 in which a spiral spring 60 is seated. The connector 39 is secured relative to the axle housing 57 and the frame 58 by means of a bar 61. The connector 39 having the transverse bars or plates 40 is secured to the bar 61 by means of the U-bolts 41. The bar 61 is secured relatively to the axle 57 by means of a pair of U-bolts 62 which extend through a clamping plate 63 engaging beneath the bar 61. The bar 61 is provided with an inwardly projecting bend 64 and a vertical bend 65, with the vertical bend 65 terminating in a horizontal inwardly projecting bend 66. The bend or extension 66 is secured to the tractor frame 58 by means of a U-bolt 67.

Where it is desired to more evenly couple the trailer to the tractor vehicle the coupling means embodying plates 47, bushing 46, plate 48 and ball member 49 may be reversed after the manner shown in Fig. 16. In reversing the coupling member, the plate 48 is disposed in forwardly projecting position, instead of rearwardly projecting position.

In the use and operation of this hitch the tongues or draw bars 29 and 30 are connected through the plates 39 and bolts 41 to the springs and axle housing of the tractor vehicle. The ball 49 is mounted in the ball socket 50 of the trailer and the rear ends of the springs 53 are connected by means of the attaching bolts 56 to the draw bars 27 of the trailer. The springs 53 are preferably placed under substantial tension and are equally tensioned so that the coupling plate member 47 will normally be held at right angles to the line of travel.

With a trailer hitch as hereinbefore described, the trailer will be held against any whipping action due to the tension of the springs 53 and the crossing of the draw bars 29 and 30.

What is claimed is:

A trailer hitch comprising a pair of crossed bars, means pivotally securing the forward ends of said bars relative to the rear axle housing of a tractor vehicle, a trailer coupling member pivotally secured to the rear ends of said bars, said member comprising a vertical plate, vertical bushings on the opposite ends of said plate, the rear ends of said bars being upturned and pivotally engaging in said bushings, a rearwardly projecting plate carried by said vertical plate, a ball member carried by said rearwardly projecting plate, a pair of springs each secured at one end to a respective bar, and means securing the opposite ends of said springs to the trailer.

References Cited in the file of this patent

UNITED STATES PATENTS

| | | |
|---|---|---|
| 1,020,393 | Almgren | Mar. 19, 1912 |
| 1,435,753 | Stolz | Nov. 14, 1922 |
| 2,705,648 | McCleskey | Apr. 5, 1955 |